United States Patent Office 3,365,396
Patented Jan. 23, 1968

3,365,396
OVERBASED CALCIUM SULFONATE
Raymond C. Schlicht, Fishkill, N.Y., assignor to Texaco Inc., New York, N.Y., a corporation of Delaware
No Drawing. Filed Dec. 28, 1965, Ser. No. 517,070
5 Claims. (Cl. 252—33)

ABSTRACT OF THE DISCLOSURE

A method of preparing an overbased calcium sulfonate lube oil concentrate having a total base number greater than about 250, a calcium content greater than about 10 wt. percent and a metal ratio of at least about 10, which is suitable as a lube oil additive comprising forming an anhydrous first mixture of a sulfo compound, calcium hydroxide, lubricating oil and alkoxy-ethanol, subsequently adding urea thereto, refluxing the resultant mixture under anhydrous conditions and stripping said mixture to recover said concentrate as residue.

---

This invention is directed to a new method for preparing overbased calcium sulfonate-lubricating oil concentrate. More particularly, it is directed to a method of producing very highly overbased calcium sulfonate-lube oil concentrates, e.g., having a total base number (TBN) greater than about 250, a lube oil dispersible calcium content greater than about 10 wt. percent, and a metal ratio of at least about 10.

Lubricants in internal combustion engines are subjected to severe conditions, particularly in diesel engine operations where lubricating compositions encounter temperatures as high as 700° F. and higher and pressures of 900 p.s.i.g. and more. Under such conditions of operation, the lubricating oil composition has a tendency to deteriorate and form gum deposit on the piston ring and other parts of the engine. Such deposits cause sticking and blockage, thus markedly reducing the effectiveness of engine operation. Further, because of the frequent presence of high sulfur contents employed in the residual fuels in diesel engines, large amounts of acidic by-products form resulting in the need for lubricating oils having high oil dispersible basic metal contents.

Overbased metal sulfonates are known to have excellent detergent characteristics and are particularly effective in preventing sludge build-up in heavy duty oils used for combustion engines such as diesel engines. Further, overbased metal sulfonates are excellent in neutralizing the acidic blow-by gas escaping from the cylinder area of the engine into the lubricating media. One of the most effective overbased sulfonates is overbased calcium sulfonate, and yet it is relatively inexpensive in respect to the other alkaline earth overbased metal sulfonates such as overbased barium sulfonate.

As used herein the term "overbased calcium sulfonate" is intended to denote a complex calcium salt of sulfonic acid containing calcium values which are dispersible in lubricating oils in colloidal-like form in amounts in excess of that sufficient to form neutral calcium sulfonate. In further explanation, it is theorized that the overbased calcium sulfonate contemplated herein is in actuality a complex of neutral calcium sulfonate of the general formula $(RSO_3)_2Ca$ and calcium carbonate $(CaCO_3)$ where R represents the hydrocarbon moiety. The neutral calcium sulfonate and excess calcium, probably in the form of calcium carbonate, appear to interact chemically and/or physically in a manner to maintain the excess calcium in a lubricating oil dispersible (colloidal) state. It is to be noted that the number of hydrogen equivalents of calcium and of sulfonic acid in neutral calcium sulfonate are each 2 and the metal ratio is 1. Overbased calcium sulfonates are denoted when the ratio of number of equivalents of calcium metal to equivalents of sulfonic acid is greater than 1, that is, the overbased sulfonates have a metal ratio greater than 1.

In the above the total base number (TBN) is determined by a modified version of the test procedure D664 of the American Society for Testing and Materials (ASTM), the modification being the employment of perchloric acid rather than hydrochloric acid and as the titrating acid. Further, a total base number of at least about 250 for the overbased calcium sulfonate-lube oil concentrate contemplated herein is essentially equivalent to an overbased calcium sulfonate-lube oil concentrate having a calcium content of at least about 10 wt. percent and a metal ratio of at least about 10.

In the past, much difficulty has been experienced in the production of highly overbased calcium sulfonate-lube oil concentrates having a total base number greater than about 250. In the first place, difficulty was experienced in placing that amount of calcium required to give a TBN of at least about 250 in a filterable oil dispersible state, that is, in micro colloidal form. In the past, concentrates containing overbased calcium sulfonate in amounts sufficient to give such high TBN would often undesirably lose much of the overbased calcium sulfonate via precipitation.

Another difficulty encountered in the past in the production of overbased calcium sulfonate-lube oil concentrates of calcium contemplated herein was that many of the prior overbased calcium sulfonate-lube oil concentrates could not be readily clarified by filtration without substantial loss of calcium values therein and without substantially blocking the filtering mechanism, thereby substantially retarding the passage of the crude concentrate therethrough. This loss and blockage appeared to be the result of the fact that the calcium values in the overbased sulfonate were not in a sufficiently fine state so as to pass standard filtration procedures to produce a clarified product. It is to be noted that filtration is normally required in the manufacture of overbased calcium sulfonate-lube oil concentrates in that the consumers' preference is normally for an essentially clear product.

I have discovered and this constitutes my invention a method of producing overbased calcium sulfonate-lube oil concentrate having a TBN greater than about 250, an oil dispersible calcium content greater than about 10 wt. percent, and a calcium metal ratio greater than about 10, preferably having a TBN between about 275 and 400, a calcium content of between about 11 and 16 wt. percent and a metal ratio between about 10:1 and 15:1 wherein the calcium values therein are in a lube oil dispersible (colloidal) state, the concentrate being readily clarified by standard filtration means without a substantial loss of overbasing calcium values or substantial blockage of standard filtering mechanisms.

More particularly, I have discovered the foregoing can be accomplished by a method of manufacture employing a particular combination of ingredients, order of ingredient addition and reaction conditions.

Broadly, my method comprises contacting under anhydrous conditions a mixture comprising a sulfo compound selected from the group consisting of oil soluble sulfonic acid and alkali metal and calcium salts thereof, calcium hydroxide, urea, a lubricating oil and an alkoxyethanol of from 3 to 4 carbons at a temperature between about 120 and 180° C., preferably under conditions of essentially total reflux for a period of time, e.g., between about 1 and 10 hours. Under preferred conditions, the reaction is conducted in an inert gas atmosphere such as nitrogen. The resultant reaction mass is then stripped, e.g, at a temperature between about 175 and 200° C., preferably employing an inert stripping gas such as nitrogen, to remove volatile by-products such as ammonia and alkoxyethanol leaving as residue crude overbased calcium sulfonate-lube oil concentrate contemplated herein which is readily filterable with relatively low product loss in filtration.

By the term "anhydrous," it is intended to denote a water content of from 0 to 0.2 wt. percent based on the reaction mixture.

In the foregoing procedure, the mole ratio of sulfo compound to calcium hydroxide to urea is at least about 1:10:10, preferably between about 1:12:11 and 1:20:20, with the lubricating oil and alkoxyethanol respectively constituting between about 30 and 50 wt. percent and between 5 and 30 wt. percent of the initial reaction.

In the method it is intended that a mixture of calcium oxide and water in a mole ratio of calicum oxide to water of at least 1:1, preferably less than about 2:1, be equivalent to calcium hydroxide. When the calcium oxide-water combination is employed as a substitute for calcium hydroxide, calcium hydroxide is formed in situ via the reaction of calcium oxide and water during an initial reaction stage prior to the interaction of the sulfo compound, urea, in situ formed calcium hydroxide, lube oil and alkoxyethanol.

One of the critical features in my method is the maintenance of essentially anhydrous conditions after entry of the $Ca(OH)_2$ into the reaction mixture whether added or formed in situ. It appears when there is the simultaneous presence of water and urea without a sufficient amount of a product such as calcium oxide which will more readily react with water than urea there results an overbased calcium sulfonate-lube oil concentrate having markedly reduced oil dispersible calcium content which in turn results in a product of substantially reduced total base number and metal ratio. Further, the presence of this free water produces a concentrate which has poor filterability and high overbased sulfonate loss on the filter mechanism.

In connection with the anhydrous criticality, the sulfo reactant is often commercially provided as a lubricating oil solution having a minor water content of between about 1 and 10 wt. percent. Therefore, when calcium hydroxide is the initial reactant rather than calcium oxide and water, it is necessary to remove this water impurity from the sulfo reactant and any other water associated with the other reactants before their contact with urea. This removal can be accomplished by combining all the reactants save urea and stripping out water from the resultant mixture, e.g., at a temperature between about 110 and 140° C. for a period of time, e.g., between about 0.5 and 2 hours, preferably utilizing an inert stripping gas such as nitrogen. Subsequent to the water removal pretreatment, urea is then added and the method of the invention is commenced. Under most preferred conditions, calcium hydroxide is also not included in the pretreated reaction mixture until the removal of free water thereby further promoting filterability, reduced filter loss, increased TBN and filterable calcium content. However, when calcium hydroxide is to be formed in situ, the water associated with the sulfo reactant and other reaction ingredients need not be removed since it can be included as part of the required water for the conversion of the calcium oxide to calcium hydroxide.

Another critical feature in the method of the invention is the employment of the alkoxyethanol. It appears in the absence of an alkoxyethanol or in the use of substitutes such as methanol, toluene and xylene overbased calcium sulfonate-lube oil concentrates are produced which have markedly reduced dispersible calcium metal values and are materially more difficult to filter.

A third critical feature is the maintenance of the reaction temperature between about 120–180° C. Temperatures outside the range produce a final product of reduced dispersible calcium content.

It is to be noted that a portionwise addition, e.g., 2 to 5 portions of urea to the reaction mixture during heating is preferred since such type of addition appears to produce an overbased calcium sulfonate-lube oil concentrate which has somewhat improved filterability with less calcium value loss than when all the urea is added initially. Further, the introduction of urea as a solution rather than as a solid is also preferred in terms of improved filterability. The most preferred solvent for said solution is the alkoxyethanol vehicle of the method, however, lower boiling solvents may be employed such as methanol and ethanol as long as they are essentially immediately removed from the reaction situ after addition. When a urea solution is employed, the urea content is normally between about 5 and 50 wt. percent.

It is believed the reason for the success of the foregoing method in producing overbased calcium sulfonate-lube oil concentrate containing such high calcium value content is the foregoing specific combination of ingredients and conditions produce a calcium sulfonate-calcium carbonate particle combination in a colloidal form of a degree of such fineness, e.g., less than about 200 microns that said particles do not agglomerate and precipitate from the lube oil concentrate and are substantially fine enough to pass the standard filtration mechanisms in the production of a clarified concentrate.

The oil soluble sulfo compound reactant contemplated herein is a member selected from the group consisting of sulfonic acid, neutral calcium sulfonate and alkali metal sulfonates such as neutral sodium sulfonate. When an alkali metal sulfonate or sulfonic acid is utilized as the starting reactant, the neutral calcium sulfonate is formed in the reaction situ under the conditions of the method during the first heating step. In order to facilitate the conversion of the alkali metal sulfonate and sulfonic acid into calcium sulfonate, a calcium halide such as calcium chloride is preferably included in combination with the calcium hydroxide reactant in the initial reaction mixture, preferably in a mole ratio of sulfo compound to halide of between about 2:1 and 2.2:1. Alternatively, calcium oxide or calcium hydroxide may be utilized for the in situ conversion of the alkali metal sulfonate and sulfonic acid to the neutral calcium sulfonate when the latter is the case. Calcium oxide or calcium hydroxide is normally employed in the reaction mixture in excess, e.g. up to 30 wt. percent excess of that which is required to obtain a product of the desired TBN and calcium content.

Typical sulfonic acids from which the neutral sulfonates are derived are the oil soluble sulfonic acids which include petroleum sulfonic acids such as mahogany sulfonic acid, alkylated aromatic sulfonated sulfonic acid, petroleum sulfonic acid, paraffin wax sulfonic acid, petroleum naphthene sulfonic acid, polyisobutylene sulfonic acid, mono- and polywax or other alkylated benzene sulfonic acid, mono- and polywax or other alkyl-substituted naphthalene sulfonic acid, mono- and polywax and other substituted cyclohexyl sulfonic acid and mixtures of the foregoing. Preferably, the sulfonic acid is one having been derived from the sulfonation of a petroleum fraction or a synthetic hydrocarbon. In addition, the preferred sulfonic acid is a monosulfonic acid having a molecular weight between about 350 and 1500, more preferably between about 400 and 600.

By the term "oil soluble," I mean soluble in a conventional mineral and synthetic lubricating oil fraction to the extent of at least 5 wt. percent.

It is to be noted the sulfo reactant is often commercially supplied in solution form, that is, in a form comprising between about 60 and 100 wt. percent of the sulfonic acid or neutral sulfonate and between about 40 and 0 wt. percent lubricating oil (synthetic or hydrocarbon), e.g., of an SUS viscosity of between about 50 and 200 at 100° F., and often including an impurity amount, e.g., less than 10 wt. percent water. Therefore, within the term "sulfo compound" these solutions are included.

As to the lubricating oil ingredient in the method of the invention, it may be supplied from petroleum or synthetic oil stock. It advantageously has an SUS viscosity at 100° F. between about 50 and 250. Examples of the lubricating oils contemplated herein are mineral lubricating oils such as exemplified by naphthenic base, paraffinic base and mixed base oils derived from petroleum hydrocarbon. In addition synthetic oils are contemplated such as alkylene polymers including polymers of propylene, polymers of alkylene oxide and esters of dicarboxylic acid, polymers of silicones, aromatic type oils such as alkylphenol diethers, alkylbiphenyls and polyphenols.

The alkoxyethanols contemplated herein are methoxyethanol and ethoxyethanol and mixtures thereof. Specific examples are 2-methoxyethanol and 2-ethoxyethanol. The preferred alkoxyethanol is 2-methoxyethanol.

The following examples further illustrate the invention but are not to be considered as limitations thereof.

EXAMPLE I

This example illustrates the method of the invention.

To a one liter flask fitted with a stirrer, reflux condenser, nitrogen gas inlet tube and thermocouple there was charged 149 grams of a solution comprising about 69 wt. percent sodium didodecyl benzene sulfonate of about 450 molecular weight, about 29 wt. percent mineral lubricating oil and 2 wt. percent $H_2O$, 211 grams of mineral lubricating oil of an SUS viscosity of 100 at 100° F., 200 mls. of 2-methoxyethanol, 112 grams of calcium hydroxide and 15 grams of calcium chloride. The resultant mixture was heated under stripping conditions from ambient (about 25° C.) to 140° C. for a period of about 1½ hours while passing nitrogen at a rate of about 100 mls./minute as a stripping gas over the reaction mixture surface to aid in the continuous removal via 2-methoxyethanol azeotrope of water by-product and the water in the initial sulfonate reactant. The amount of total distillate removed was 60 mls. The reaction mixture was then cooled to 100° C. and 91 grams of urea were added. The resultant second reaction mixture was heated to 140° C. under total reflux in a nitrogen atmosphere and retained at that temperature for a period of 4 hours. At the end of the 4-hour period, in order to remove unreacted initial reactants and volatile by-products, the temperature was increased to 180° C., the total reflux was terminated and nitrogen gas stripping at a rate of about 500 mls./minute was reinstituted. The residual stripped mixture was then readily filtered by passing it through a cotton twill filter cloth precoated with a diatomaceous silica filter aid under vacuum and 330 grams of clarified overbased calcium sulfonate-lube oil concentrate was recovered having an oil dispersible calcium content of 11.7 wt. percent, a total base number of 311, a metal ratio of 11.5, and an overbased calcium sulfonate content in said concentrate of 48.2 wt. percent.

EXAMPLE II

This example further illustrates the method of the invention.

The procedure of Example I was repeated with the exception that 125 mls. rather than 200 mls. of 2-methoxyethanol were employed and the first heating temperature was 134–138° C. rather than 140° C. The final overbased calcium sulfonate-lube oil concentrate filterate had a lube oil dispersible calcium content of 11.7 wt. percent a TBN of 311, a metal ratio of 11.5 and an overbased calcium sulfonate content of 48.2 wt. percent.

EXAMPLE III

This example still further illustrates the method of the invention.

The procedure of Example I was repeated except the total reflux heating was conducted for a period of 3 hours instead of 4 hours. The filtered overbased calcium sulfonate-lube oil concentrate final product contained 11.2 wt. percent oil dispersible calcium, had a TBN of 297 and a metal ratio of 10.8 and an overbased calcium sulfonate content of 47.3 wt. percent.

EXAMPLE IV

This example when compared to Examples I to III demonstrates the criticality of maintaining the reaction under initial anhydrous conditions.

The precedure of Example I was repeated with the exception that urea was added in the initial charge of ingredients and the initial stripping (water removal) of the reaction mixture before reflux was eliminated. In addition, the total reflux temperature was maintained at 132° C. rather than at 140° C. The filtered overbased sulfonate-lube oil concentrate product had an oil dispersible calcium content of 9.2 wt. percent, a TBN of 241, a metal ratio of 8.3:1 and an overbased calcium sulfonate content of 43.7 wt. percent. In other words, under essentially the same conditions, the introduction of urea prior to the removal of water undesirably accounts for approximately a 25 percent decrease in oil dispersible calcium content, total base number, and metal ratio.

EXAMPLE V

This example still further illustrates the criticality of adding urea after the first heating step.

The procedure of Example I was essentially repeated except urea in an amount of 83 grams was added initially, the reflux period was 3 rather than 4 hours, and the initial stripping (water removal) step was eliminated. The product was unfilterable in the filter system utilized for the clarification of the product in Examples I, II and III.

EXAMPLE VI

This example when compared to Examples I to III shows the criticality of employing alkoxyethanols as defined in the method of the invention.

The procedure of Example I was employed with the following exceptions: (1) 200 mls. of toluene and 25 mls. water were substituted for the 200 mls. of methoxyethanol, (2) after the first heating the temperature was cooled to 110° rather than 100° C. for the urea addition, (3) the total reflux time was 5 hours rather than 4 hours and the total reflux temperature was 126–134° C. rather than 140° C. The final filtered overbased calcium sulfonate-lube oil concentrate had a lube oil dispersible calcium content of 7.5 wt. percent, a TBN of 193, a metal ratio of 6.5, and an overbased sulfonate content of 40.6 wt. percent. Comparing the above relatively low calcium content and TBN with that of Examples I–III indicates the importance of employing an alkoxyethanol as defined in the reaction.

EXAMPLE VII

This example as in Example VI when compared to Examples I–III demonstrates the importance of employing alkoxyethanol defined in the method of the invention.

The procedure of Example I was repeated with the following exceptions: (1) 25 mls. of water and 120 mls. of xylene were substituted for 200 mls. of methoxyethanol, (2) the initial stripping was to 190° C. rather than 140° C. and the initial cooling was to 110° C. rather than 100° C., (3) the total reflux time was 5 hours rather than 4 hours and the reflux temperature was 110°–140° C. rather than 140° C. The filtered overbased calcium sulfonate-lube oil concentrate product had a lube oil dispersible calcium content of 7.6 wt. percent, a total base number of 202, a metal ratio of 6.5 and an overbased calcium content of 40.6 wt. percent. Comparing these relatively low values of Examples I–III indicates the importance of employing alkoxyethanol as defined in the method of the invention.

EXAMPLE VIII

This example when compared to Examples I–III still further demonstrates the importance of employing the alkoxyethanol as defined in the method of the invention.

The procedure of Example I was essentially repeated except the reaction mixture consisted of 294 grams of a lube oil solution of calcium sulfonate which was derived from a sodium sulfonate of a molecular weight of about 450, 66 grams of mineral lubricating oil of an SUS viscosity at 100° F. of 100, 450 mls. of methanol, 106 grams of calcium hydroxide, 82.5 grams of urea. There was no initial stripping of the reaction mixture and the reaction mixture was heated under reflux at 140° C. for a period of 6 hours. The filtered product was the mineral oil solution of overbased calcium sulfonate having a relatively low calcium content of 7.5 wt. percent and a total base number of 202.

EXAMPLE IX

This example illustrates the criticality of maintaining the reaction temperature within the prescribed range.

The procedure of Example I was essentially repeated with the exception that the reflux was conducted at 100° C. rather than 140° C. The resultant product had a relatively low total base number of 249 and a calcium content of 9.2 wt. percent.

I claim:

1. A method of preparing an overbased calcium sulfonate-lube oil concentrate comprising:
   (a) forming an anhydrous first mixture comprising (1) a sulfo compound selected from the group consisting of lube oil soluble sulfonic acid, lube oil soluble neutral calcium sufonate, and lube oil soluble neutral alkali metal sulfonate, (2) calcium hydroxide, (3) a lubricating oil, and (4) an alkoxyethanol of 3 to 4 carbons, and adding urea thereto,
   (b) refluxing the resultant mixture under anhydrous conditions at a temperature between about 120 and 180° C.,
   (c) then stripping said resultant mixture at an elevated temperature to remove said alkoxyethanol and volatile by-product and recovering said concentrate as residue,
   (d) said sulfo compound, said calcium hydroxide, said urea being initially present in a mole ratio of at least about 1:10:10, said alkoxyethanol constituting between about 5 and 30 wt. percent of the initial resultant mixture and said lubricating oil constituting between about 30 and 50 wt. percent of the initial resultant mixture.

2. A method in accordance with claim 1 wherein said sulfo compound is oil soluble sodium sulfonate, said alkoxyethanol is 2-methoxyethanol, said lubricating oil is mineral lubricating oil, said refluxing is conducted in an inert gas atmosphere, said anhydrous first mixture also includes calcium chloride in a mole ratio of said sodium sulfonate to said calcium chloride of between about 2:1 and 2.2:1 and said stripping is conducted at a temperature between about 175 and 200° C. utilizing an inert stripping gas and subsequently filtering the stripped reaction mixture to recover said overbased calcium sulfonate and lube oil concentrate as filtrate.

3. A method in accordance with claim 1 wherein said forming of said anhydrous first mixture comprising refluxing a mixture of said sulfo compound, said lubricating oil, said urea and said alkoxyethanol with calcium oxide and water, said calcium oxide and water being in a mole ratio of greater than about 1:1 calcium oxide to water at a temperature between about 120 and 180° C.

4. A method in accordance with claim 1 wherein said forming of said anhydrous first mixture comprises heating a water containing mixture of said sulfo compound, said calcium hydroxide, said lubricating oil and said alkoxyethanol at a temperature between about 110 and 140° C. to remove water and subsequently adding said urea to the resultant dehydrated mixture.

5. A method in accordance with claim 1 wherein said forming of said anhydrous first mixture comprises heating a water containing mixture of said sulfo compound, said lubricating oil, said alkoxyethanol at a temperature between about 110 and 140° C. to remove water and subsequently adding said calcium hydroxide and urea to the resultant dehydrated mixture.

References Cited

UNITED STATES PATENTS

| | | | |
|---|---|---|---|
| 2,595,556 | 5/1952 | Worth et al. | 252—33 X |
| 2,961,403 | 11/1960 | Blumer | 252—33 |
| 3,057,896 | 10/1962 | Schlicht et al. | 252—33 X |
| 3,172,855 | 3/1965 | Rogers et al. | 252—33 X |
| 3,256,186 | 6/1966 | Greenwald | 252—33 |

FOREIGN PATENTS

| | | |
|---|---|---|
| 212,328 | 1/1958 | Australia. |
| 774,683 | 5/1957 | Great Britian. |

DANIEL E. WYMAN, *Primary Examiner.*

PATRICK P. GARVIN, *Examiner.*